United States Patent
Ahn

(10) Patent No.: US 8,106,883 B2
(45) Date of Patent: Jan. 31, 2012

(54) MOBILE TERMINAL AND METHOD FOR MOVING A CURSOR AND EXECUTING A MENU FUNCTION USING A NAVIGATION KEY

(75) Inventor: Hyun Ju Ahn, Seoul (KR)

(73) Assignee: LG Electronics Inc., Seoul (KR)

( * ) Notice: Subject to any disclaimer, the term of this patent is extended or adjusted under 35 U.S.C. 154(b) by 870 days.

(21) Appl. No.: 11/548,258

(22) Filed: Oct. 10, 2006

(65) Prior Publication Data

US 2008/0084388 A1    Apr. 10, 2008

(51) Int. Cl.
*G09G 5/08* (2006.01)

(52) U.S. Cl. ........ 345/158; 345/166; 345/169; 345/157; 345/159; 455/566

(58) Field of Classification Search ............... 345/157, 345/158, 156, 167, 160, 168, 163, 166, 418; 455/575.1, 566, 151.2, 456.6, 550.1, 152.1; 712/321; 372/39
See application file for complete search history.

(56) References Cited

U.S. PATENT DOCUMENTS

| | | | | |
|---|---|---|---|---|
| 5,195,179 A * | 3/1993 | Tokunaga | | 345/159 |
| 5,801,681 A * | 9/1998 | Sayag | | 345/157 |
| 6,552,713 B1 * | 4/2003 | Van Brocklin et al. | | 345/157 |
| 6,781,570 B1 * | 8/2004 | Arrigo et al. | | 345/158 |
| 6,977,645 B2 * | 12/2005 | Brosnan | | 345/166 |
| 7,058,432 B2 * | 6/2006 | Nishimoto | | 455/575.1 |
| 7,137,073 B2 * | 11/2006 | Kim et al. | | 715/828 |
| 2002/0052209 A1 * | 5/2002 | Frohlund | | 455/456 |
| 2002/0130835 A1 * | 9/2002 | Brosnan | | 345/156 |
| 2002/0155857 A1 * | 10/2002 | Nishimoto | | 455/550 |
| 2003/0034439 A1 * | 2/2003 | Reime et al. | | 250/221 |
| 2005/0108657 A1 * | 5/2005 | Han | | 715/827 |

FOREIGN PATENT DOCUMENTS

WO    WO 01/95304 A1 * 12/2001
WO    WO 01/95305 A1 * 12/2001

* cited by examiner

*Primary Examiner* — Lun-Yi Lao
*Assistant Examiner* — Olga Merkoulova
(74) *Attorney, Agent, or Firm* — Lee, Hong, Degerman, Kang & Waimey

(57) ABSTRACT

A mobile terminal and method for moving a cursor and executing a menu function in respons to operations of a navigation key by the user are disclosed. The mobile terminal includes an optical sensor navigation key installed in the mobile terminal, wherein the navigation key senses a direction of movement and speed of movement of an object that contacts the navigation key and outputs signals based on the sensed speed and direction, and a controller configured to control an operation of the mobile terminal in response to the signals from the optical sensor navigation key. The optical sensor navigation key, which is a new type of user interface, is provided so that the user can operate the mobile terminal simply, conveniently and precisely.

16 Claims, 12 Drawing Sheets

MOBILE TERMINAL AND METHOD FOR MOVING A CURSOR AND EXECUTING A MENU FUNCTION USING A NAVIGATION KEY

FIELD OF THE INVENTION

The present invention relates to a mobile terminal, and more particularly, to a mobile terminal and method for moving a cursor and executing a menu function in response to operations of a navigation key by the user.

DESCRIPTION OF THE RELATED ART

In general, a mobile terminal has a navigation key for moving a cursor on a screen and the execution of a menu function. The configuration of such a conventional navigation key will hereinafter be described in brief with reference to FIG. 1.

FIG. 1 is a front view illustrating a navigation key of a conventional mobile terminal. As illustrated in FIG. 1, the navigation key 10 of the conventional mobile terminal generally includes four direction keys 11, 12, 13 and 14 for moving a cursor 20 up, down, left and right, respectively, and a menu execution key 15 for executing a menu function.

Upon entering a menu, the user selects a desired menu item in the menu by moving the cursor 20 to the desired menu item using the four direction keys 11-14 and then executes the selected menu item using the menu execution key 15. However, because the conventional navigation key 10 has the four direction keys 11-14 each associated with one of four directions, the user has to sequentially depress at least two of the four direction keys to move the cursor 20 diagonally.

SUMMARY OF THE INVENTION

Features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

Accordingly, the present invention is directed to a mobile terminal and a method that substantially obviate one or more problems due to limitations and disadvantages of the related art. An object of the present invention is to provide a mobile terminal and method that is capable of freely moving a cursor in any direction by using an optical sensor navigation key, thereby facilitating the easy and convenient execution of a menu function.

In one aspect of the present invention, a mobile terminal is provided. The mobile terminal includes an optical sensor navigation key adapted to sense a movement direction of an object with which the optical sensor navigation key makes contact and to generate signals according to the sensed movement direction and movement speed and a controller adapted to control a function of the mobile terminal in response to the signals generated by the optical sensor navigation key.

It is contemplated that the optical sensor navigation key includes an optical signal recognizer adapted to optically recognize a movement of the object and an optical signal output unit adapted to receive an indication of the recognized movement from the optical signal recognizer, convert the indication into an electrical signal indicative of the recognized movement and output the electrical signal to the controller. It is further contemplated that the optical signal recognizer includes a contact window adapted to make contact with the object, a light emitting diode adapted to generate light and emit the generated light through the contact window, an optical lens adapted to focus light reflected from the object and an optical signal reader adapted to generate the indication of the recognized movement using the focused light.

It is contemplated that the controller is further adapted to move a cursor on a display screen of the mobile terminal such that the cursor may be moved up, down, right, left or diagonally in response to the signals generated by the optical sensor navigation key. It is further contemplated that the controller is further adapted to control movement of a cursor on a display screen of the mobile terminal, the movement controlled according to a style of a menu displayed on the display screen and in response to the signals generated by the optical sensor navigation key.

It is contemplated that the controller is further adapted to move the cursor in the same direction as the sensed movement direction if the menu style is a grid style. It is further contemplated that the controller is further adapted to move the cursor in one of an up, down, right and left direction according to the sensed movement direction if the menu style is a list style.

It is contemplated that the optical sensor navigation key is further adapted to sense a movement speed of the object and the controller is further adapted to open an upper menu or a lower menu of a menu item displayed on a display screen of the mobile terminal when a cursor is positioned at the displayed menu item, the upper menu opened if the sensed movement speed is greater than a reference value with respect to a first direction and the lower menu opened if the sensed movement speed is greater than the reference value with respect to a second direction. It is further contemplated that the first direction is opposite to the second direction.

It is contemplated that the controller is further adapted to execute a function corresponding to an icon in the opened upper menu or lower menu if the optical sensor navigation key is clicked more than a predetermined number of times when the cursor is positioned on the icon. It is further contemplated that the optical sensor navigation key is located at a navigation key position of an input unit of the mobile terminal.

In another aspect of the present invention, a method for controlling a function of a mobile terminal is provided. The method includes sensing a movement direction of an object that contacts an optical sensor navigation key installed in the mobile terminal, generating signals according to the sensed movement direction and movement speed and controlling the function of the mobile terminal in response to the signals.

It is contemplated that controlling the function of the mobile terminal includes moving a cursor on a display screen of the mobile terminal up, down, right, left or diagonally. It is further contemplated that controlling the function of the mobile terminal includes moving a cursor on a display screen of the mobile terminal according to a style of a menu displayed on the display screen.

It is contemplated that controlling the function of the mobile terminal further includes moving the cursor in the same direction as the sensed movement direction if the menu style is a grid style. It is further contemplated that controlling the function of the mobile terminal further includes moving the cursor up, down, right or left according to the sensed movement direction if the menu style is a list style.

It is contemplated that controlling the function of the mobile terminal includes sensing a movement speed of the object and opening an upper menu or a lower menu of a menu item displayed on a display screen of the mobile terminal when a cursor is positioned at the displayed menu item, the upper menu opened if the sensed movement speed is greater than a reference value with respect to a first direction and the lower menu opened if the sensed movement speed is greater than the reference value with respect to a second direction. It is further contemplated that the first direction is opposite to the second direction.

It is contemplated that the method further includes executing a function corresponding to an icon in the opened one of an upper menu and a lower menu if the optical sensor navigation key is clicked more than a predetermined number of times when the cursor is positioned on the icon. It is further contemplated that sensing the movement direction and the movement speed of an object includes emitting a generated light through a contact window, focusing light reflected from the object and generating an indication of a recognized movement of the object using the focused light.

Additional features and advantages of the invention will be set forth in the description which follows, and in part will be apparent from the description, or may be learned by practice of the invention. It is to be understood that both the foregoing general description and the following detailed description of the present invention are exemplary and explanatory and are intended to provide further explanation of the invention as claimed.

These and other embodiments will also become readily apparent to those skilled in the art from the following detailed description of the embodiments having reference to the attached figures, the invention not being limited to any particular embodiments disclosed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. Features, elements, and aspects of the invention that are referenced by the same numerals in different figures represent the same, equivalent, or similar features, elements, or aspects in accordance with one or more embodiments.

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE PREFERRED EMBODIMENTS

The present invention relates to an apparatus and method for providing information that allows the user of the apparatus to determine his or her geographical location relative to another designated geographical location. Although the present invention is illustrated with respect to a mobile communication device, it is contemplated that the present invention may be utilized anytime it is desired to determine one's location in relation to a designated geographical location.

Reference will now be made in detail to the preferred embodiments of the present invention, examples of which are illustrated in the accompanying drawings.

Reference will now be made in detail to the preferred embodiments of the present invention, examples of which are illustrated in the accompanying drawings. Wherever possible, the same reference numbers will be used throughout the drawings to refer to the same or like parts.

The present invention is applicable to various types of terminals such as a game machine, digital camera and portable media player (PMP), as well as digital broadcasting receiving terminals and mobile terminals such as a personal digital assistant (PDA), mobile phone and smart phone. For the convenience of description, the present invention is disclosed with reference to a mobile terminal, such as a mobile phone. However, it is to be understood that the present invention is not limited thereto.

Figure 1:
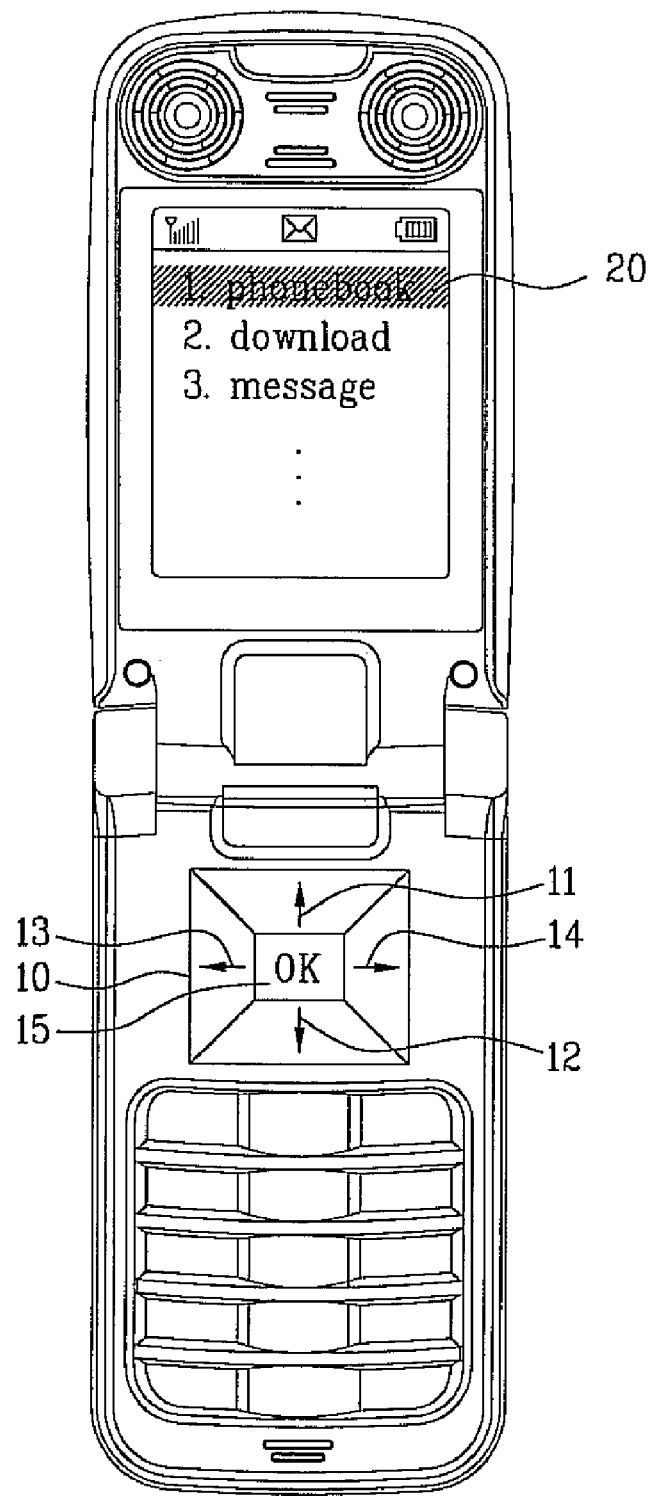
FIG. 1 is a front view illustrating a conventional mobile terminal.
Figure 2:
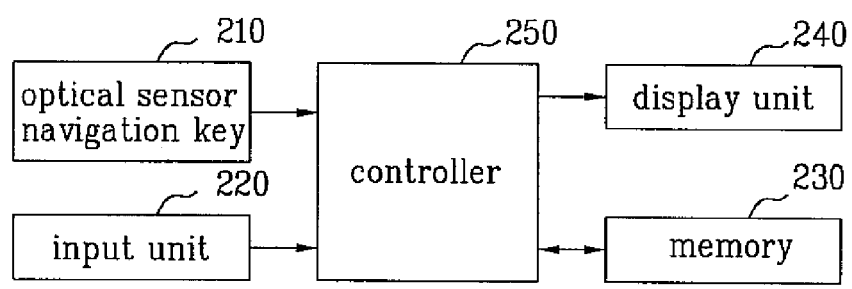
FIG. 2 is a block diagram showing one embodiment of a mobile terminal having an optical sensor navigation key according to the present invention.

FIG. 2 is a block diagram illustrating one embodiment of a mobile terminal with an optical sensor navigation key according to the present invention. As illustrated in FIG. 2, the mobile terminal includes an optical sensor navigation key, 210, an input unit 220, a memory 230, a display unit 240 and a controller 250. Although not illustrated, the mobile terminal may further include a digital broadcast receiver and a radio frequency (RF) circuit.

The optical sensor navigation key 210 functions to emit light of a predetermined frequency to sense a direction of movement and speed of movement of an object with which it is contacted and outputs signals based on the sensed direction and speed to the controller 250. Preferably, the optical sensor navigation key 210 is provided at an existing navigation key position of the input unit 220. Alternatively, the optical sensor navigation key 210 may be positioned in various locations depending on the structure of the mobile terminal.

Figure 3:
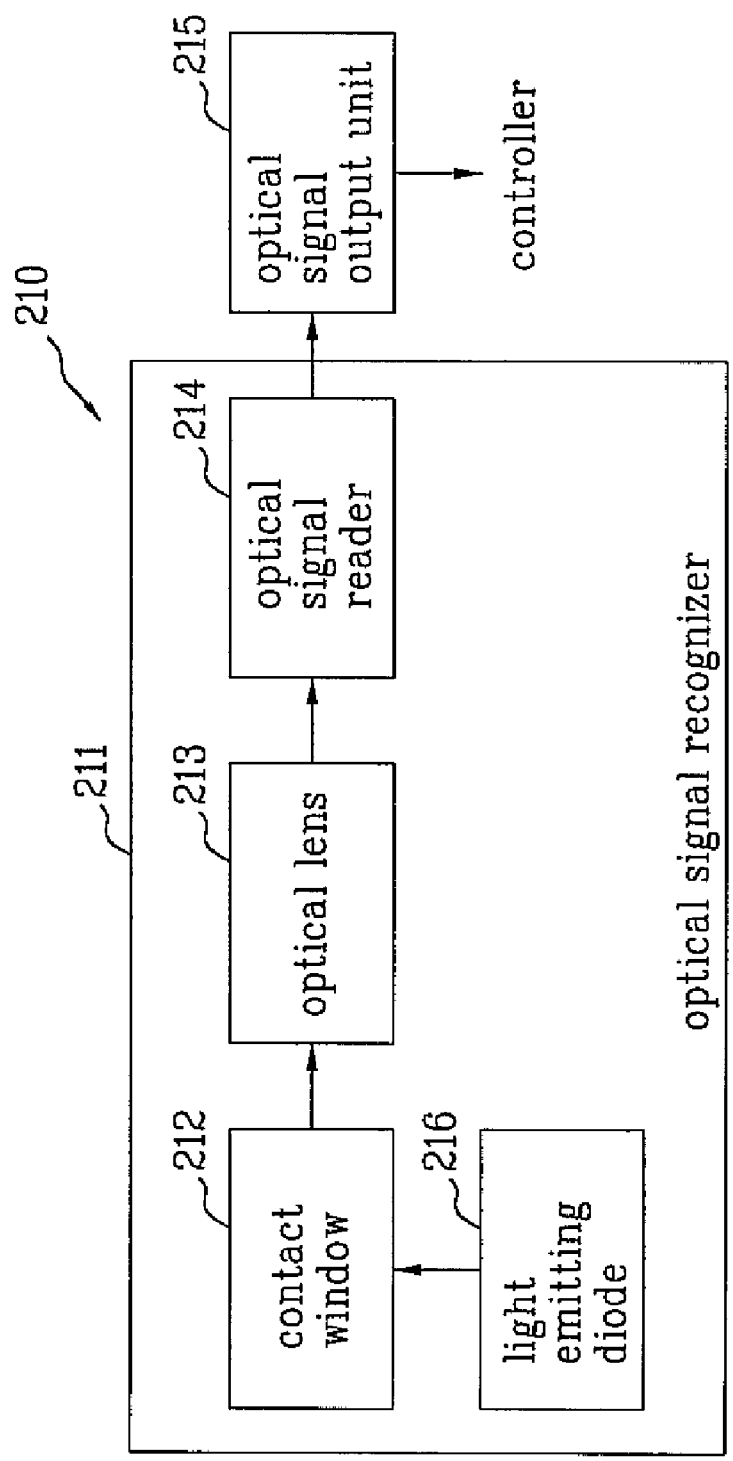
FIG. 3 is a block diagram showing one embodiment of the optical sensor navigation key according to the present invention.

A detailed description will hereinafter be given of the configuration of the optical sensor navigation key 210 with reference to FIG. 3. FIG. 3 is a block diagram illustrating one embodiment of the optical sensor navigation key 210 according to the present invention.

As illustrated in FIG. 3, the optical sensor navigation key 210 includes an optical signal recognizer 211 configured to optically recognize movement of an object coming into contact with a contact window 212 and an optical signal output unit 215 configured to receive indications of recognized movement from the optical signal recognizer 211. The optical signal output unit 215 is configured to indicate the direction of movement and speed of movement of the object as electrical signals based on the received recognized indications and transfer the electrical signals to the controller 250.

The optical signal recognizer 211 includes the contact window 212 configured to come into contact with the object, a light emitting diode 216 configured to emit light of the predetermined frequency through the contact window, an optical lens 213 configured to focus light reflected from the object and an optical signal reader 214 configured to receive the light focused by the optical lens 313 and generate the recognized values based on the received light.

The input unit 220 is a user interface that has a plurality of keys allocated as numerals and characters. The input unit 220 outputs key signals corresponding to the keys to the controller 250. The input unit 220 preferably includes the optical sensor navigation key 210.

The memory 230 stores a program for controlling operation of the mobile terminal, menu function-associated data and various data received and transmitted when the mobile terminal is controlled. The display unit 240, which is under control of the controller 250, receives and displays data corresponding to a key signal from the input unit 220 or displays various information related to the operation state of the mobile terminal as icons and characters.

The controller 250 controls operation of the mobile terminal. A process for controlling operation of the mobile terminal according to the present invention will hereinafter be described in detail with reference to FIG. 4.

Figure 4:
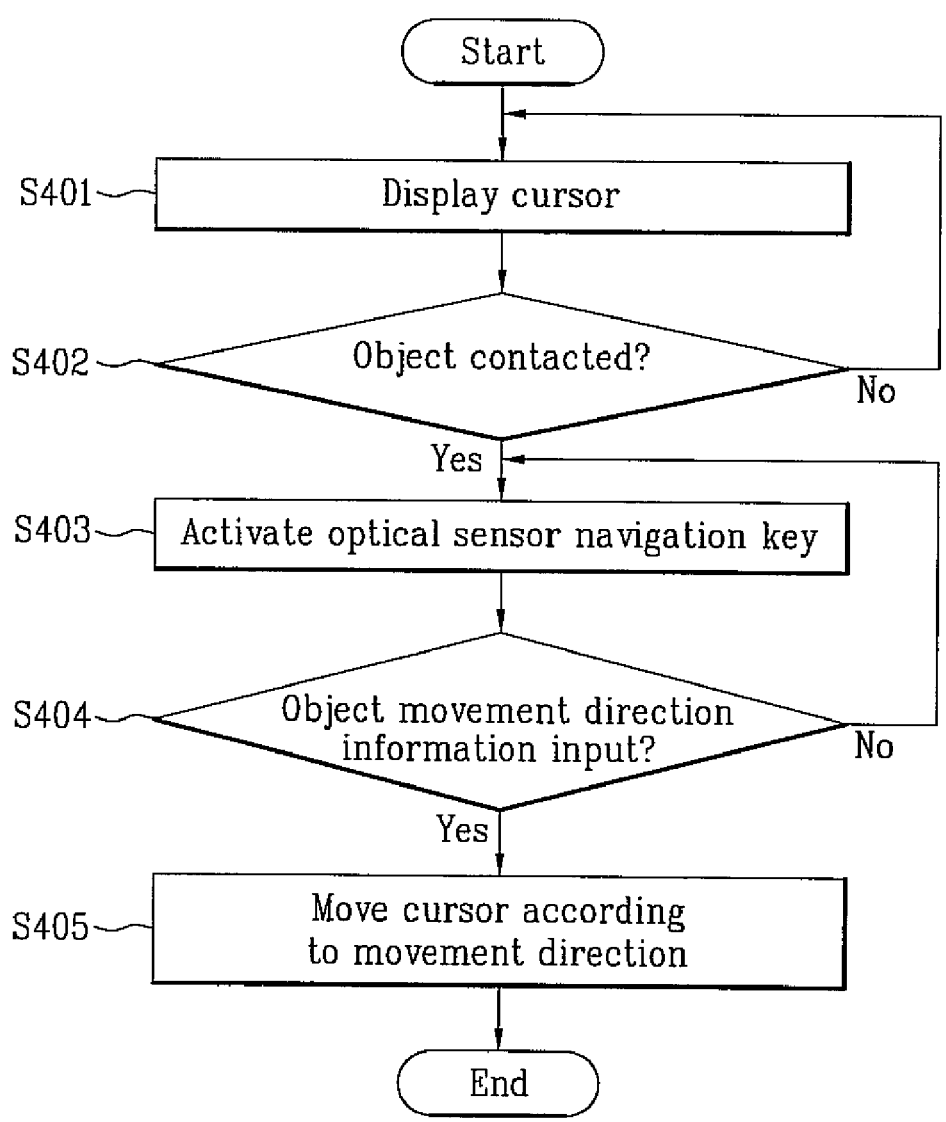
FIG. 4 is a flowchart illustrating one embodiment of a mobile terminal cursor operation control method according to the present invention.

FIG. 4 illustrates a flowchart of one embodiment of a mobile terminal cursor operation control method according to the present invention. As illustrated in FIG. 4, if an object, such as the user's finger, contacts the optical sensor navigation key 210 (S402) when a cursor is displayed on the screen of the display unit 240 (S401), the controller 250 activates the optical sensor navigation key (S403). Preferably, the cursor is a pointer indicating a portion of the terminal where information will be input or corrected, the portion indicated as a line or a figure, such as a rectangle.

If information regarding a direction of movement of the object is input from the optical sensor navigation key 210 (S404), the controller 250 moves the cursor in the direction of movement (S405). For example, when a menu is displayed on the screen in a grid style, the controller 250 moves the cursor in the same direction as the direction of movement of the object. Preferably, the controller 250 may move the cursor according to the user's settings.

On the other hand, when the menu is displayed in a list style, the controller 250 moves the cursor in the up, down, left or right direction based on the direction of movement of the object. For example, when the list style is an up/down scroll mode, the controller 250 moves the cursor up if the angle of the direction of movement is between 0° and 180° and moves the cursor down if the angle of the direction of movement is between 180° and 360°.

Alternatively, according to the user's settings, the controller 250 may move the cursor up if the angle of the direction of movement is between 90° and 270° and move the cursor down if the angle at the direction of movement is between 90° and 270°. For example, when the list style is in a left/right scroll mode, the controller 250 moves the cursor left if the angle of the direction of movement is between 90° and 270° and moves the cursor right if the angle of the direction of movement is between 90° and 270°. Alternatively, according to the user's settings, the controller 250 may move the cursor left if the angle of the direction of movement is 0° and 180° and move the cursor right if the angle of the direction of movement is between 180° and 360°.

Figure 5A:
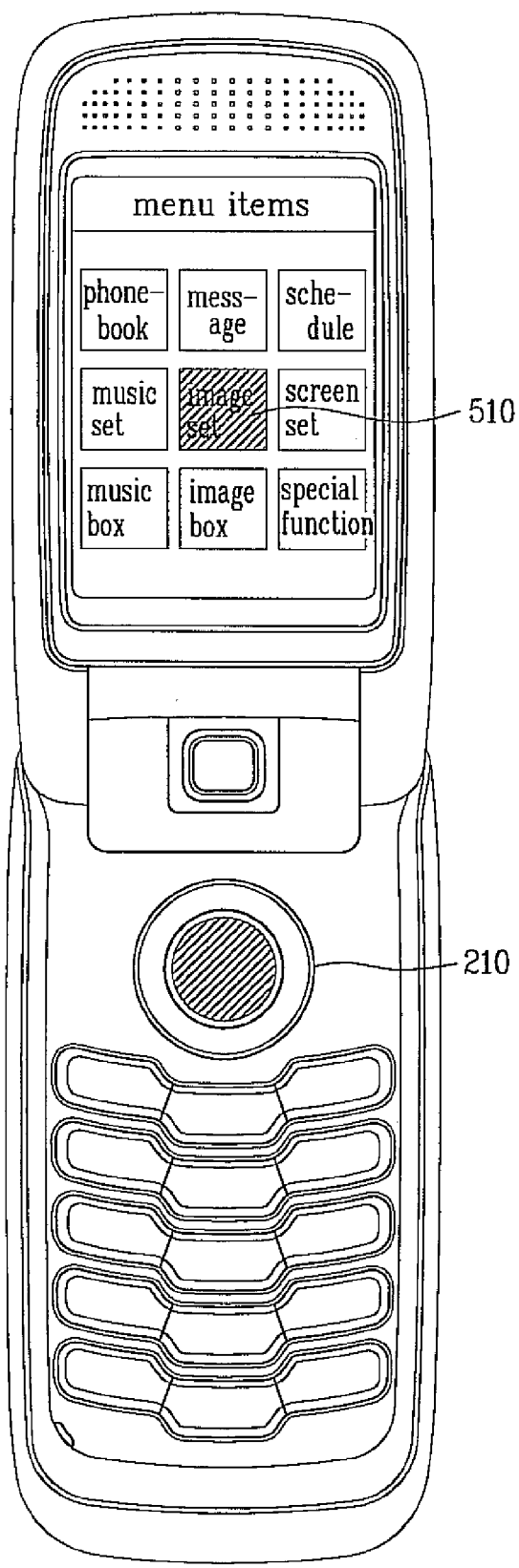
FIGS. 5a and 5b are front views illustrating movement of a cursor on a screen based on a grid menu style according to one embodiment of the present invention.
Figure 5B:
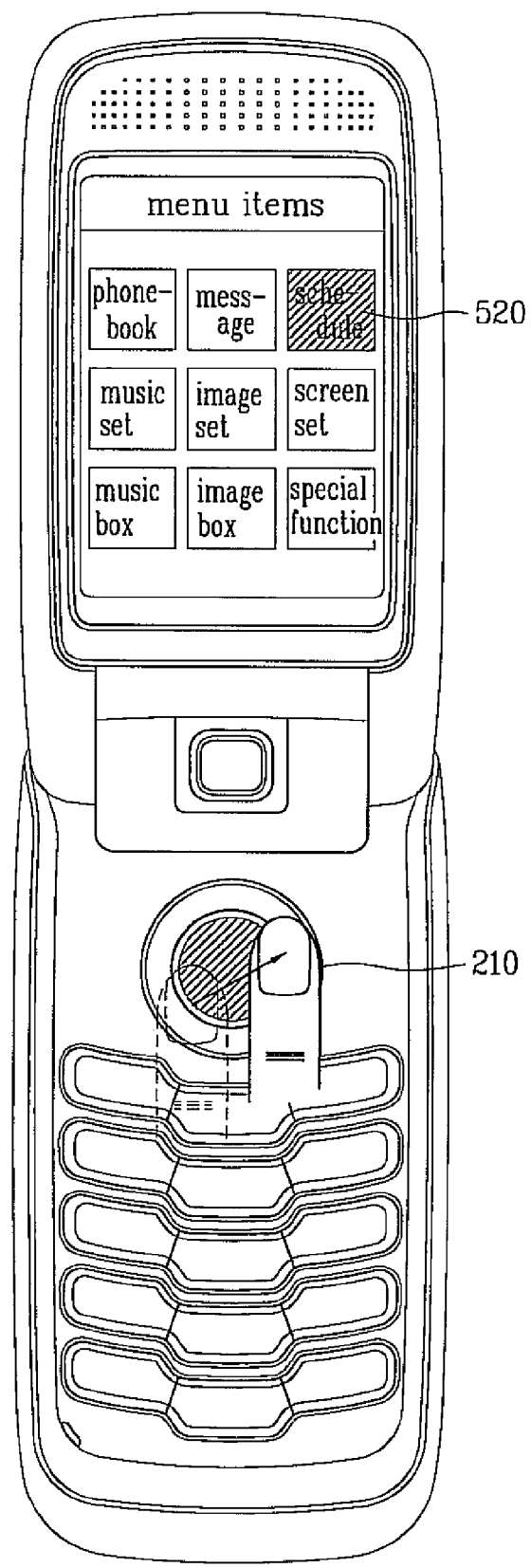

FIGS. 5*a* and 5*b* are front views illustrating movement of the cursor on the screen based on the grid menu style. As illustrated in FIGS. 5*a* and 5*b*, if the user brings his finger into contact with the optical sensor navigation key 210 and moves it in a diagonal direction, when the cursor is positioned at an "Image Set" menu item 510 of the grid menu style (refer to FIG. 5*a*), the controller 250 receives information regarding the direction of movement, or diagonal direction, from the optical sensor navigation key and then moves the cursor to a "Schedule" menu item 520 located diagonally from the "Image Set" menu item (refer to FIG. 5*b*).

Figure 6A:
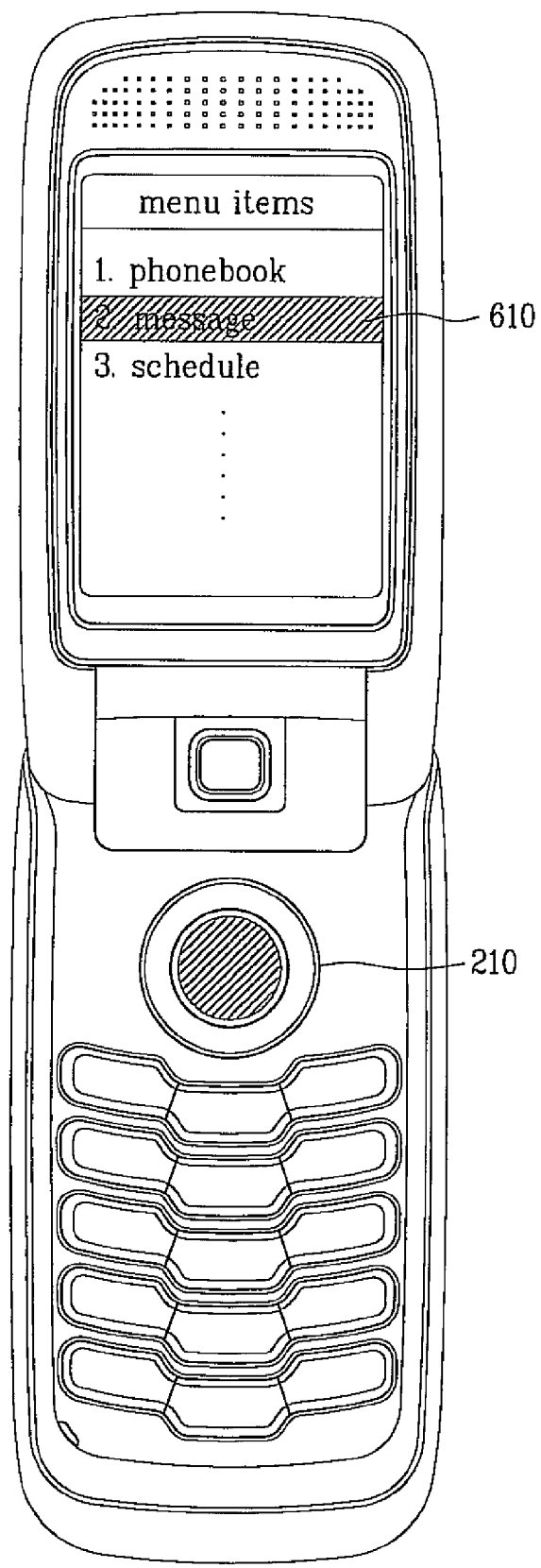
FIGS. 6a and 6b are front views illustrating movement of a cursor on a screen based on a list menu style according to one embodiment of the present invention.
Figure 6B:
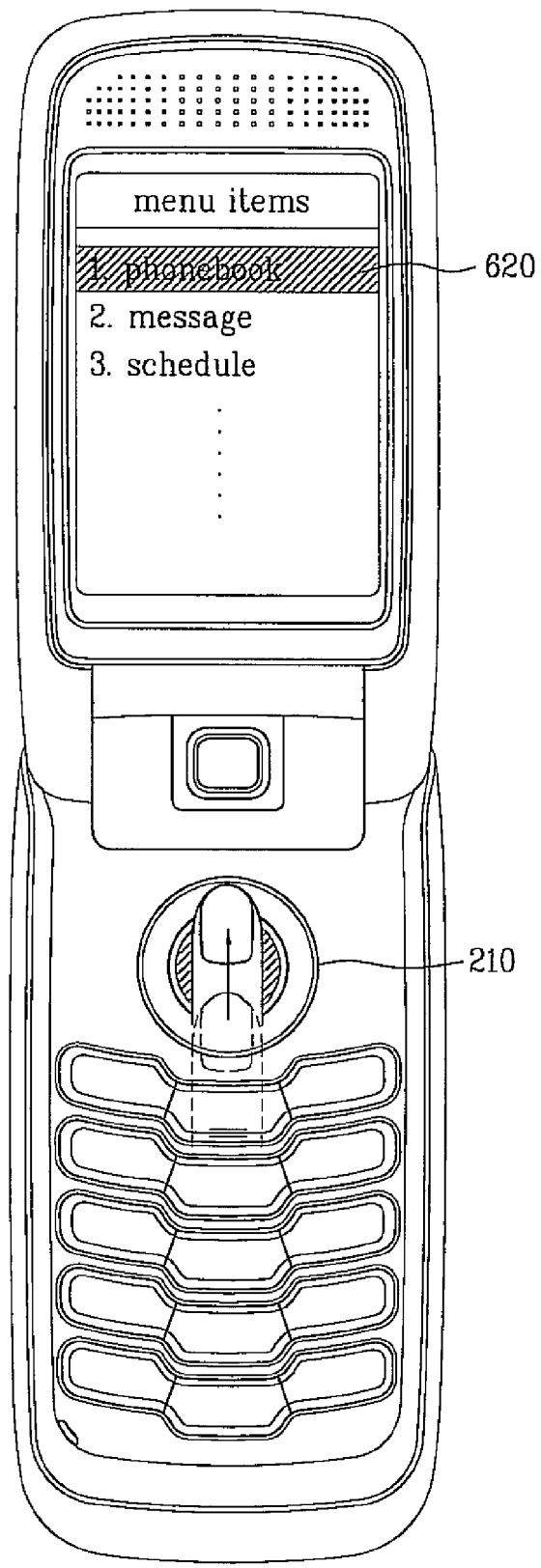

FIGS. 6*a* and 6*b* are front views illustrating movement of the cursor on the screen based on the list menu style. As illustrated in FIGS. 6*a* and 6*b*, if the user brings his finger into contact with the optical sensor navigation key 210 and moves it in an up direction when the cursor is positioned at a "2. Message" menu item 610 of the list menu style (refer to FIG. 6*a*), the controller 250 receives information regarding the direction of movement, or up direction, from the optical sensor navigation key and then moves the cursor to a "1. Phonebook" menu item 620 located above the "2. Message" menu item (refer to FIG. 6*b*).

Figure 7:
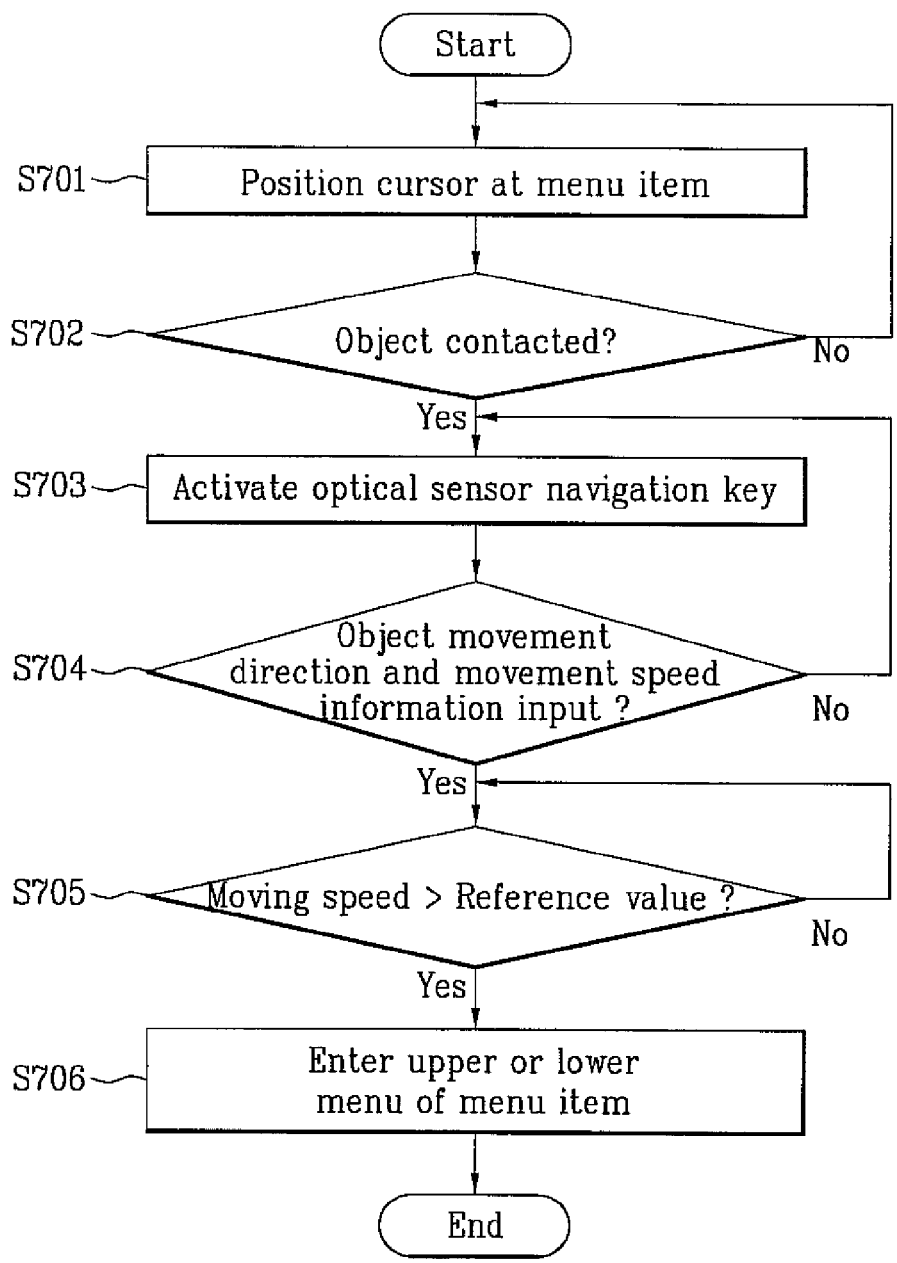
FIG. 7 is a flowchart illustrating one embodiment of a mobile terminal menu operation control method according to the present invention

FIG. 7 is a flowchart illustrating one embodiment of a mobile terminal menu operation control method according to the present invention. As illustrated FIG. 7, if an object, such as the user's finger, contacts the optical sensor navigation key 210 (S702) after the cursor has been moved to a specific menu item of the mobile terminal (S701) according to the process of FIG. 4, the controller 250 activates the optical sensor navigation key 210 (S703).

If information regarding a direction of movement and speed of movement of the object is input from the optical sensor navigation key 210 (S704), the controller 250 determines whether the speed is greater than a reference value with respect to a first or second direction (S705). Preferably, the speed of movement refers to an amount of movement of the cursor from a first pixel position to a second pixel position per second. Furthermore, the reference value is preferably refers to an amount of movement of 500 pixels or more per second in consideration of the aspect ratio (vertical x horizontal) of the display unit 240 of the mobile terminal.

If the speed is greater than the reference value with respect to the first or second direction, the controller 250 enters an upper menu or lower menu of the specific menu item at which the cursor is positioned (S706). For example, when information regarding a direction of movement of the object from left to right and information regarding a speed of movement of the object greater than the reference value are input from the optical sensor navigation key 210, the controller 250 enters the lower menu of the specific menu item at which the cursor is positioned. When information regarding a direction of movement of the object from up to down and information regarding a speed of movement of the object greater than the reference value are input from the optical sensor navigation key 210, the controller 250 enters the lower menu of the specific menu item at which the cursor is positioned.

When information regarding a direction of movement of the object from right to left and information regarding a speed of movement of the object greater than the reference value are input from the optical sensor navigation key 210, the controller 250 enters the upper menu of the specific menu item at which the cursor is positioned. When information regarding a direction of movement of the object from down to up and information regarding a speed of movement of the object greater than the reference value are input from the optical sensor navigation key 210, the controller 250 enters the upper menu of the specific menu item at which the cursor is positioned.

Preferably, the controller 250 sets the operation state of the optical sensor navigation key 210 to an active mode/sleep mode in response to the user's clicking on the optical sensor navigation key 210. For example, if the object does not contact with the optical sensor navigation key 210 for a predetermined time after the optical sensor navigation key 210 is activated, the controller 250 changes the optical sensor navigation key to a sleep mode.

After the cursor is positioned at an icon contained in the entered menu through the above-described process, data corresponding to the icon can be executed. For example, if the user clicks on the optical sensor navigation key 210 more than a predetermined number of times while the cursor is positioned at an icon contained in the entered menu, the controller 250 executes the data corresponding to the icon.

Figure 8A:
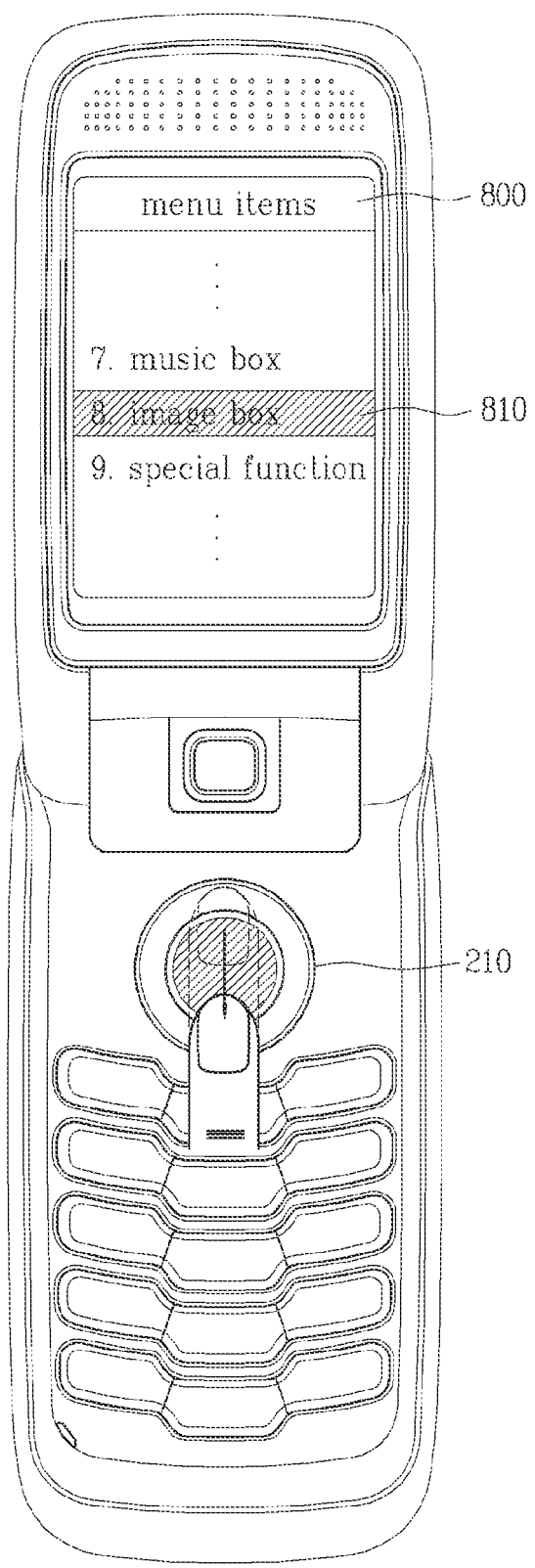
FIGS. 8a to 8c are front views illustrating one embodiment of a menu entry and execution process according to the present invention.
Figure 8B:
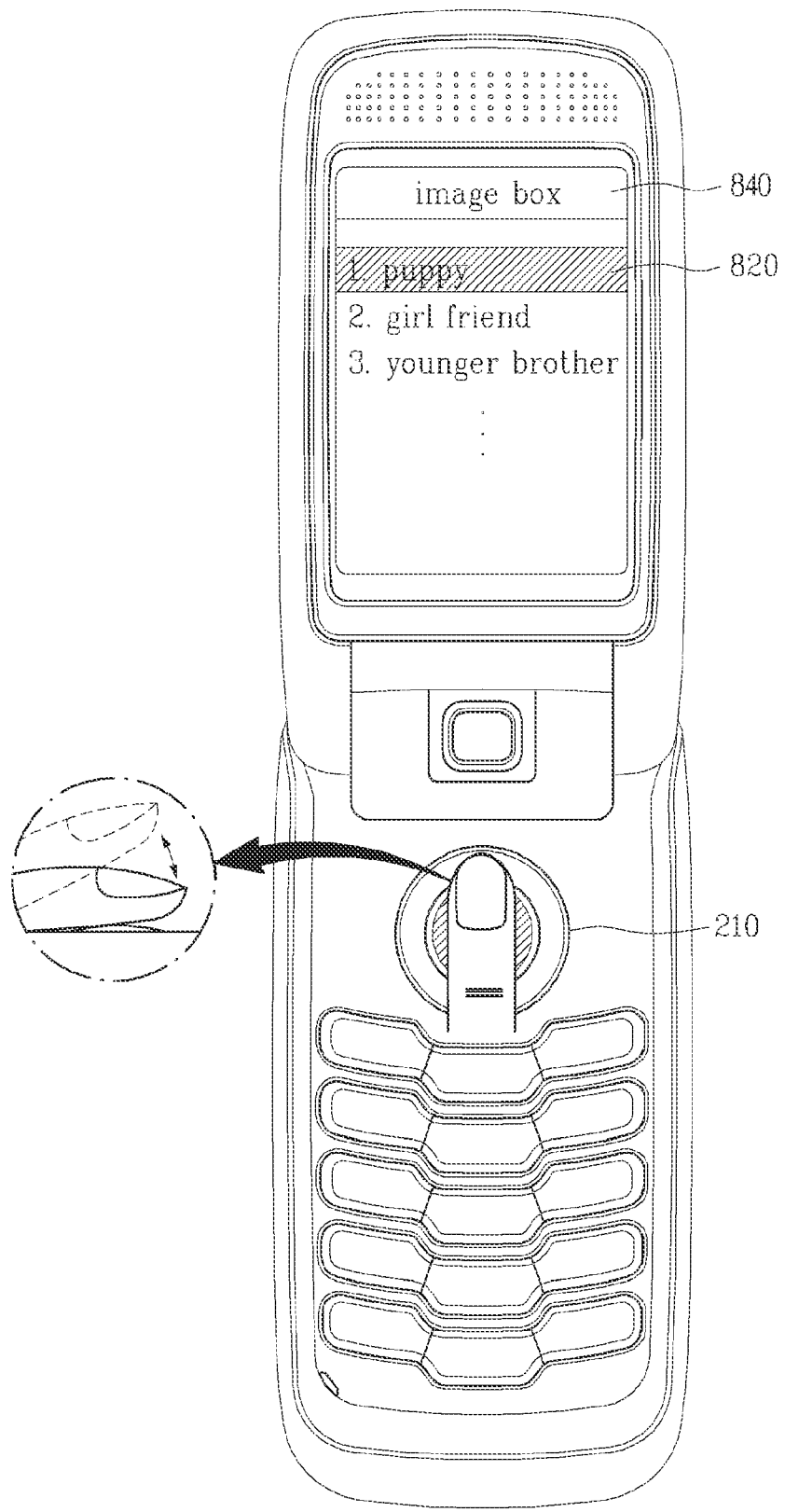
Figure 8C:
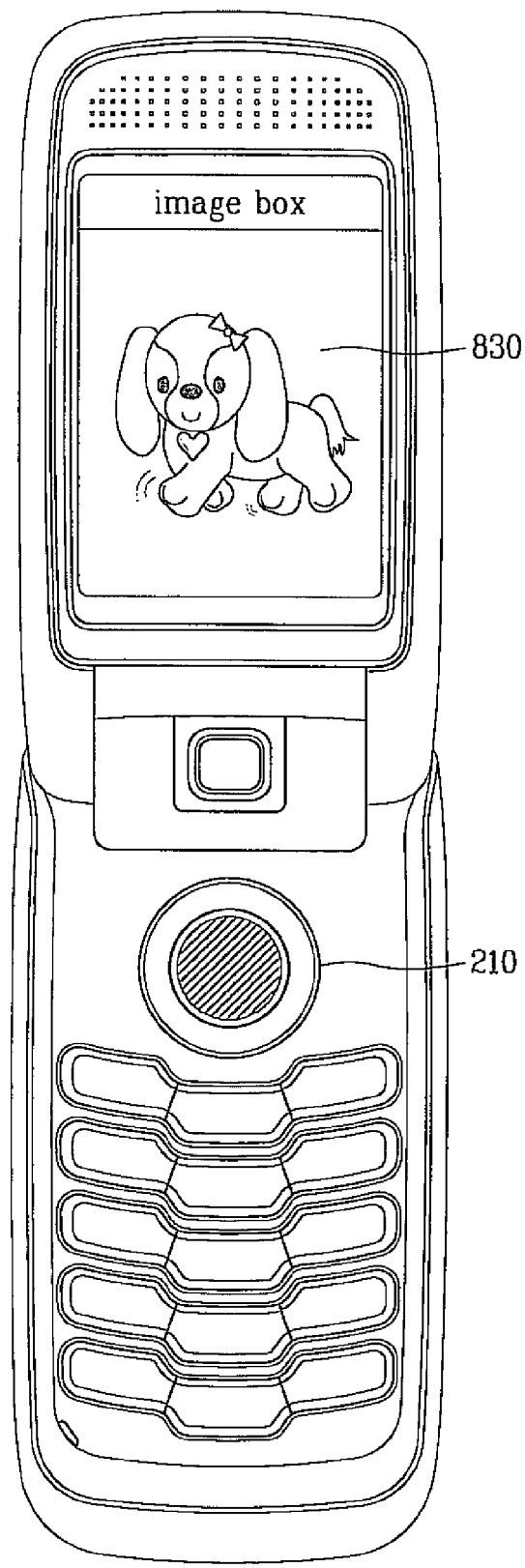

FIGS. 8*a* to 8*c* are front views illustrating one embodiment of a menu entry and execution process according to the present invention. As illustrated in FIGS. 8*a* to 8*c*, if the user brings his finger into contact with the optical sensor navigation key 210 and moves it from up to down at a speed above the reference value when the cursor is positioned at an "image box" menu item 810 of a "menu items" menu 800 (refer to FIG. 8*a*), the controller 250 displays a lower menu ("image box" menu 840) of the "image box" menu item 810 on the screen of the display unit (refer to FIG. 8*b*). For example, the lower menu or "image box" menu 840 includes a plurality of menu items such as 1. "puppy" 820, 2. "girl friend," and 3. "younger brother." Thereafter, if the user clicks on the optical sensor navigation key 210 more than a predetermined number of times while the cursor is positioned at the "puppy" menu item 820 in the lower menu or "image box" menu 840 (refer to FIG. 8*b*), the controller 250 executes a corresponding function and displays a "puppy" image 830 on the screen of the display unit 240 (refer to FIG. 8*c*). Further, if the user brings his finger into contact with the optical sensor navigation key 210 and moves it from down to up at a speed above the reference value when the cursor is positioned at the "image box" menu item 810 of the "menu items" menu 800, the controller 250 displays an upper menu on the screen of the display unit (not shown in drawning). For example, the upper menu may be a main menu including an item corresponding to the "menu items" menu 800 shown in FIG. 8*a*.

Although the preferred embodiments of the present invention have been disclosed for illustrative purposes, with respect to cursor movement, menu entry and menu execution using the optical sensor navigation key the present invention is not limited by the illustrations. For example, when a text message has been received, the user may confirm the received text message using the optical sensor navigation key. Furthermore, the user may perform precise and fine image work, which cannot be performed with a conventional navigation key having four direction keys associated with only the four directions, using the optical sensor navigation key.

The present invention provides a mobile terminal and method, wherein an optical sensor navigation key allows a user to operate the mobile terminal simply, conveniently and precisely. It will be apparent to those skilled in the art that various modifications and variations can be made in the present invention without departing from the spirit or scope of the inventions.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims. Therefore, all changes and modifications that fall within the metes and bounds of the claims, or equivalence of such metes and bounds are therefore intended to be embraced by the appended claims.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structure described herein as performing the recited function and not only structural equivalents but also equivalent structures.

What is claimed is:

1. A mobile terminal, comprising:
an optical sensor navigation key adapted to sense a movement direction and a movement speed user contact and generate signals according to the sensed movement direction and the sensed movement speed; an input unit; a display; and
a controller adapted to control a function of the mobile terminal in response to the signals generated by the optical sensor navigation key, wherein the controller is further adapted to:
cause displaying of at least one menu item and a cursor on the display; cause moving of the displayed cursor toward a location proximate to a specific menu item of the displayed at least one menu item responsive to receiving user input via the input unit; detect the user contact relative to the optical sensor navigation key; activate the optical sensor navigation key after the user contact to the optical sensor navigation key is detected and the cursor is moved to the specific menu item,
deactivate the optical sensor navigation key if the user contact to the optical sensor navigation key is not detected within a threshold amount of time after the optical sensor navigation key is activated,
determine whether the sensed movement direction is a pre-defined first direction or a pre-defined second direction when the cursor is positioned at the displayed at least one menu item, determine whether the sensed movement speed is greater than a reference value with respect to the pre-defined first direction if the sensed movement direction is the pre-defined first direction, enter an upper menu of the displayed at least one menu item at which the cursor is positioned if the sensed movement speed is greater than the reference value with respect to the pre-defined first direction,
cause displaying of the upper menu on the display screen, determine whether the sensed movement speed is greater than the reference value with respect to the pre-defined second direction if the sensed movement direction is the pre-defined second direction and the predetermined pre-defined second direction is opposite to the pre-defined first direction,
enter a lower menu of the displayed at least one menu item at which the cursor is positioned if the sensed movement speed is greater than the reference value with respect to the pre-defined second direction, and cause displaying of the lower menu on the display, and wherein the sensed movement speed is an amount of movement per second by the cursor from a first pixel position to a second pixel position on the display.

2. The mobile terminal according to claim 1, wherein the optical sensor navigation key comprises:
an optical signal recognizer adapted to optically recognize a movement of the user contact; and
an optical signal output unit adapted to receive an indication of the recognized movement from the optical signal recognizer, convert the indication into an electrical signal indicative of the recognized movement and output the electrical signal to the controller.

3. The mobile terminal according to claim 2, wherein the optical signal recognizer comprises:
  a contact window adapted to make contact with the user contact;
  a light emitting diode adapted to generate light and emit the generated light through the contact window;
  an optical lens adapted to focus light reflected from the user contact; and
  an optical signal reader adapted to generate the indication of the recognized movement using the focused light.

4. The mobile terminal according to claim 1, wherein the cursor moves in one of an up, down, right, left, or diagonal direction in response to the signals generated by the activated optical sensor navigation key.

5. The mobile terminal according to claim 1, wherein the controller is further adapted to control movement of the cursor on the display, the movement controlled according to a style of the displayed at least one menu item and in response to the signals generated by the activated optical sensor navigation key.

6. The mobile terminal according to claim 5, wherein the controller is further adapted to move the cursor in the same direction as the sensed movement direction if the style is a grid style.

7. The mobile terminal according to claim 5, wherein the controller is further adapted to move the cursor in one of an up, down, right or left direction according to the sensed movement direction if the style is a list style.

8. The mobile terminal according to claim 1, wherein the controller is further adapted to execute a function corresponding to an icon in the displayed upper menu or the displayed lower menu if the user contact to the optical sensor navigation key is detected more than a pre-defined number of times when the cursor is positioned on the icon.

9. The mobile terminal according to claim 1, wherein the optical sensor navigation key is located at a navigation key position of the input unit.

10. A method for controlling a function of a mobile terminal, the method comprising:
  displaying at least one menu item and a cursor;
  moving the displayed cursor toward a location proximate to a specific menu item of the displayed at least one menu item responsive to receiving user input;
  detecting user contact to an optical sensor navigation key of the mobile terminal; activating the optical sensor navigation key after the user contact to the optical sensor navigation key is detected and the cursor is moved to the specific menu item;
  deactivating the optical sensor navigation key if the object user contact to the optical sensor navigation key is not detected for a threshold amount of time after the optical sensor navigation key is activated;
  sensing a movement direction and a movement speed of the detected user contact to the optical sensor navigation key;
  generating signals according to the sensed movement direction and sensed movement speed; and
  controlling a function of the mobile terminal in response to the generated signals,
  wherein controlling the function of the mobile terminal comprises:
    determining whether the sensed movement direction is a pre-defined defined first direction or a pre-defined second direction when the cursor is positioned at the displayed at least one menu item,
    determining whether the sensed movement speed is greater than a reference value with respect to the pre-defined first direction if the sensed movement direction is the pre-defined first direction,
    entering an upper menu of the displayed at least one menu item at which the cursor is positioned if the sensed movement speed is greater than the reference value with respect to the pre-defined first direction, displaying the upper menu on the display screen of the display unit, determining whether the sensed movement speed is greater than the reference value with respect to the pre-defined second direction if the sensed movement direction is the pre-defined second direction and the pre-defined second direction is opposite to the pre-defined first direction,
    entering a lower menu of the displayed at least one menu item at which the cursor is positioned if the sensed movement speed is greater than the reference value with respect to the pre-defined second direction, displaying the lower menu, and wherein the sensed movement speed is an amount of movement per second by the cursor from a first pixel position to a second pixel position.

11. The method according to claim 10, wherein controlling the function of the mobile terminal further comprises moving the cursor on the display in one of an up, down, right, left, or diagonal direction.

12. The method according to claim 10, wherein controlling the function of the mobile terminal further comprises moving the cursor according to a style of the displayed at least one menu item.

13. The method according to claim 12, wherein controlling the function of the mobile terminal further comprises moving the cursor in the same direction as the sensed movement direction if the style is a grid style.

14. The method according to claim 12, wherein controlling the function of the mobile terminal further comprises moving the cursor in one of an up, down, right or left direction according to the sensed movement direction if the style is a list style.

15. The method according to claim 10, wherein controlling the function of the mobile terminal further comprises executing the function corresponding to an icon in the displayed upper menu or the displayed lower menu if the user contact to the optical sensor navigation key is detected more than a pre-defined number of times when the cursor is positioned on the icon.

16. The method according to claim 10, wherein sensing the movement direction and the movement speed comprises:
  emitting a generated light;
  focusing the generated light reflected from the user contact; and
  generating an indication of a recognized movement of the detected user contact using the focused light.

* * * * *